United States Patent
Holostov et al.

(10) Patent No.: US 9,756,540 B2
(45) Date of Patent: *Sep. 5, 2017

(54) SYSTEM AND METHOD FOR OFFLOADING TRAFFIC FROM CELLULAR NETWORKS

(71) Applicant: Microsoft Technology Licensing, LLC, Redmond, WA (US)

(72) Inventors: Vladimir Holostov, Sammamish, WA (US); Mohammad Shabbir Alam, Redmond, WA (US); Shai Guday, Redmond, WA (US); Rao Salapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,136

(22) Filed: Sep. 30, 2014

(65) Prior Publication Data

US 2015/0016406 A1 Jan. 15, 2015

Related U.S. Application Data

(63) Continuation of application No. 13/631,520, filed on Sep. 28, 2012, now Pat. No. 8,897,782.

(Continued)

(51) Int. Cl.
*H04W 4/00* (2009.01)
*H04W 36/22* (2009.01)
(Continued)

(52) U.S. Cl.
CPC ........... *H04W 36/22* (2013.01); *H04W 12/06* (2013.01); *H04W 84/12* (2013.01)

(58) Field of Classification Search
CPC ...... H04W 12/06; H04W 36/22; H04W 84/12
(Continued)

(56) References Cited

U.S. PATENT DOCUMENTS 8,027,678 B2 9/2011 Tysowski et al.
8,107,939 B2 1/2012 Hassan
(Continued)

FOREIGN PATENT DOCUMENTS

JP 2007515831 6/2007
JP 2008-098880 A 4/2008
(Continued)

OTHER PUBLICATIONS

European Communication for EPC Application No. 13738374.1, 1 page, mailed May 28, 2015.

(Continued)

*Primary Examiner* — Babar Sarwar
(74) *Attorney, Agent, or Firm* — Klarquist Sparkman, LLP

(57) ABSTRACT

An extensible framework for offloading data traffic sent to a mobile computing device over a cellular network to a wireless network comprises software plugins, a plugin host that is typically part of the mobile device operating system, and plugin interfaces through which the plugin host communicates with the plugins. A plugin is associated with one or more mobile operators. The framework can comprise one or more plugins, but typically, only one plugin is active at a time. The framework can automatically detect and connect to wireless networks associated with a mobile operator associated with an active plugin. The plugin can automatically authenticate the mobile device or a mobile device user with the mobile operator over the connected wireless network. The plugins are not allowed access to operating system functions responsible for detecting and connecting and disconnecting to a wireless network, which can improve mobile operating system stability and battery life.

18 Claims, 8 Drawing Sheets

Related U.S. Application Data

(60) Provisional application No. 61/586,966, filed on Jan. 16, 2012.

(51) Int. Cl.
*H04W 12/06* (2009.01)
*H04W 84/12* (2009.01)

(58) Field of Classification Search
USPC ....... 455/404.2, 410–411, 412.1–412.2, 420, 455/421, 422.1, 432.1, 435.2, 435.3, 436, 455/437, 438, 440, 444, 450, 452.2, 453, 455/456.1, 456.5, 456.6, 445, 41.1, 41.2, 455/509, 513, 464, 515, 525, 558, 550.1, 455/556.1, 556.2; 370/230, 230.1, 232, 370/237, 235, 252, 310.2, 322, 328, 338, 370/331, 332, 341, 348, 352, 353
See application file for complete search history.

(56) References Cited

U.S. PATENT DOCUMENTS

| | | | |
|---|---|---|---|
| 2006/0227972 A1* | 10/2006 | Brok | H04W 48/16 380/270 |
| 2006/0286977 A1 | 12/2006 | Khandelwal et al. | |
| 2009/0011773 A1* | 1/2009 | Balachandran | H04W 84/12 455/456.1 |
| 2009/0318124 A1* | 12/2009 | Haughn | G06F 8/65 455/418 |
| 2010/0290424 A1* | 11/2010 | Collingrige | H04L 12/5692 370/329 |
| 2010/0291863 A1 | 11/2010 | Hsu et al. | |
| 2011/0075557 A1* | 3/2011 | Chowdhury | H04L 12/14 370/230 |
| 2011/0310875 A1* | 12/2011 | Tysowski | H04W 48/16 370/338 |
| 2011/0317571 A1* | 12/2011 | Kokkinen | H04W 24/00 370/252 |
| 2011/0320588 A1* | 12/2011 | Raleigh | H04W 36/245 709/224 |
| 2012/0023189 A1* | 1/2012 | Giaretta | H04W 48/18 709/217 |
| 2012/0026992 A1* | 2/2012 | Navda | H04W 4/003 370/338 |
| 2013/0143532 A1* | 6/2013 | Liu | H04W 12/04 455/411 |

FOREIGN PATENT DOCUMENTS

| | | |
|---|---|---|
| JP | 2013-522986 A | 6/2013 |
| WO | WO 2009/098432 | 8/2009 |
| WO | WO2011/110108 A1 | 9/2011 |
| WO | WO 2011149533 | 12/2011 |

OTHER PUBLICATIONS

Supplementary European Search Report for EPC Application No. 13738374.1, 2 pages, mailed May 28, 2015.
"Wi-Fi Offload Whitepaper Version 1.0", Published on: Apr. 19, 2010, Available at: www.gsma.com/go/download/?file=wifioffloadwhitepaper.pdf, 29 pages.
Bubley, Dean, "Carrier WiFi Opportunities Enabling Offload, Onload and Roaming", Published on: Aug. 2011, Available at: https://www.wifimobilize.com/pdf/whitepaper.pdf, 23 pages.
International Search Report and Written Opinion for PCT/US2013/020917, dated Apr. 29, 2013, 10 pages.
European Communication for EPC Application No. 13738374.1, 2 pages, mailed Jun. 15, 2015.
European Examination Report for EPC Application No. 13738374.1, 2 pages, mailed Jun. 15, 2015.
Office Action Issued in Japanese Patent Application No. 2014-552277, Mailed Aug. 23, 2016, 6 Pages.
First Office Action and Search Report Issued in Chinese Patent Application No. 201380005712.6, Mailed Date: Apr. 8, 2016, 15 Pages.

\* cited by examiner

SYSTEM AND METHOD FOR OFFLOADING TRAFFIC FROM CELLULAR NETWORKS

CROSS REFERENCE TO RELATED APPLICATION

This application is a continuation of U.S. patent application Ser. No. 13/631,520, filed Sep. 28, 2012, which claims the benefit of U.S. Provisional Patent Application No. 61/586,966, filed on Jan. 16, 2012, entitled "EXTENSIBLE FRAMEWORK FOR WIRELESS NETWORK CONNECTIVITY," both of which are incorporated herein by reference in their entireties.

BACKGROUND

Cellular networks are struggling to keep up as subscriber demand for content, in particular video content, increases. One technique used to address this problem is Wi-Fi offloading, in which mobile network operators offload traffic from cellular networks to Wi-Fi networks.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

An extensible framework is described that allows application developers to implement a software plugin with mobile operator-specific logic for offloading cellular data to Wi-Fi hotspots. The framework includes interfaces and callbacks that a plugin can use to specify preferred Wi-Fi networks, attempt authentication and inform the platform and the user of success or failure of the connection attempt. As mobile devices can be used on different networks, a single device can contain multiple plugins that are activated according to subscriber identity or network properties.

In one embodiment of a method of offloading data traffic sent over a cellular network to a mobile computing device, a plugin host sends information about networks detected by a mobile device to an active plugin. The active plugin and detected networks are associated with a particular mobile operator. The plugin returns information about preferred networks selected from the detected networks. The mobile device is connected to one of the preferred networks and the plugin host requests that the active plugin authenticate the mobile device or mobile device user. Information indicating that the authentication was successful is received from the active plugin and the data traffic is offloaded from the cellular network to the connected wireless network.

The foregoing and other objects, features, and advantages of the disclosed technologies will become more apparent from the following Detailed Description, which proceeds with reference to the accompanying figures.

DETAILED DESCRIPTION

The technologies described herein allow for data traffic being sent over a cellular network to/from a mobile computing device, such as a smart phone or a tablet computer, to be offloaded to another wireless network, such as a Wi-Fi LAN (Local Area Network). The offloading is enabled by an extensible framework implemented in the mobile computing device. The framework provides for the automatic connection to a wireless network and automatic authentication of the mobile device (or a mobile device user). The framework comprises a plugin host (authentication software module host or authentication plugin host) and one or more software plugins (authentication software modules or authentication plugins). The software plugins are typically supplied by mobile network operators (MO) or ISVs (independent software vendors) and contain the information needed for the automatic connection and authentication. A mobile computing device configured with network offloading technologies described herein can automatically connect to Wi-Fi hotspots for offloading cellular data traffic without user intervention. As used herein, the term "hotspot" means a site that offers access to a network, typically the Internet.

Figure 1:
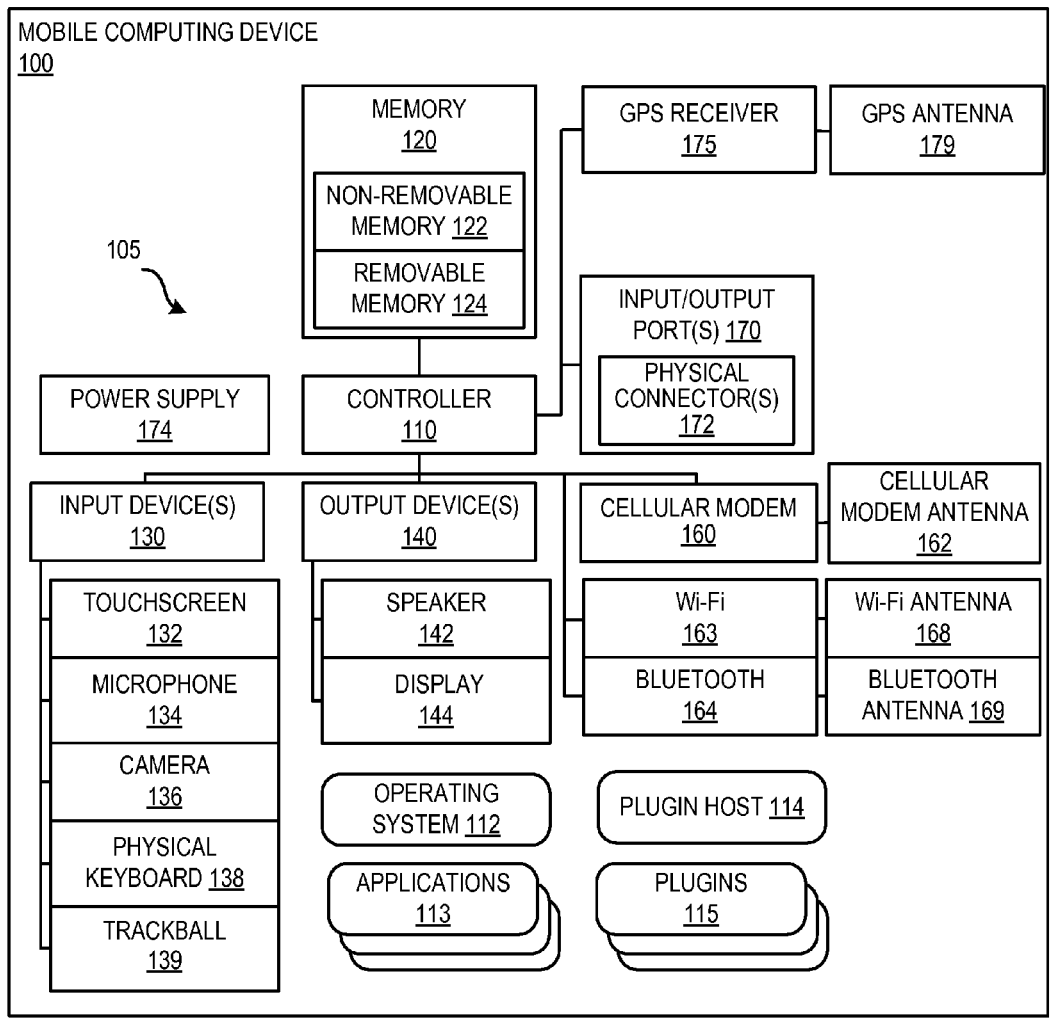
FIG. 1 is a system diagram depicting an exemplary mobile computing device.

FIG. 1 is a system diagram depicting an exemplary mobile computing device (mobile device) 100 that can be used to perform any of the methods described herein. The mobile computing device 100 can include a variety of optional hardware and software components 105. Generally, components 105 can communicate with other components, although not all connections are shown, for ease of illustration. The mobile device 100 can be any of a variety of mobile computing devices such as a cell phone, smartphone, handheld computer, laptop computer, notebook computer, tablet device, slate device, media player, consumer electronic device (e.g., network-enabled camera, video camera) and can allow wired or wireless communication with one or more networks, such as a Wi-Fi, cellular or satellite network. Although termed a "mobile" computing device, in some embodiments, the mobile device 100 can be a computing device typically considered not to be mobile, such as a desktop computer or server.

The mobile device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 113. The application programs 113 can include common mobile computing applications (e.g., email applications, calendars, contact managers, web browsers, messaging applications) as well as other computing applications.

The mobile computing device 100 can include memory 120. Memory 120 can include non-removable memory 122 and removable memory 124. The non-removable, or embedded memory, 122 can include RAM, ROM, flash memory, a hard drive, or other well-known memory storage technologies. The removable memory 124 can include flash memory cards (e.g., SD (Secure Digital) cards), memory sticks, Subscriber Identity Module (SIM) cards, which are well known in GSM (Global System for Mobile Communication) systems, or other well-known memory storage technologies, such as "smart cards." The memory 120 can be used for storing data and/or computer-executable instructions for running the operating system 112, application programs 113, the plugin host 114 and the plugins 115 on the device 100. The plugin host 114 can be part of the operating system 112. Example data can include web pages, text, images, sound files, video data, wireless network databases or other data sets to be sent to and/or received from one or more network servers or other devices by the mobile computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can also have access to external memory (not shown) such as external hard drives.

The mobile device 100 can support one or more input devices 130, such as a touch screen 132, microphone 134, camera 136, physical keyboard 138 and/or trackball 139 and one or more output devices 140, such as a speaker 142 and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via wired or wireless connections. Some devices can serve more than one input/output function. For example, touchscreen 132 and display 144 can be combined in a single input/output device.

A wireless cellular modem 160 can be coupled to a cellular modem antenna 162 and can support two-way communications between the mobile computing device 100 and a mobile cellular communication network. The mobile device 100 can comprise other radio-based modems such as a Wi-Fi modem 163 or a Bluetooth modem 164, each of which can be coupled to its own antenna (e.g., Wi-Fi antenna 168, Bluetooth antenna 169). The cellular modem 160 is typically configured for communication with one or more cellular networks, such as a GSM network for data and voice communications within a single cellular network, between cellular networks, or between the mobile computing device and a public switched telephone network (PSTN).

The mobile computing device 100 can further include at least one input/output port 170 (which can be, for example, a USB port, IEEE 1394 (FireWire) port, and/or RS-232 port) comprising physical connectors 172, a power supply 174 and a satellite navigation system receiver such as a GPS receiver 175. The GPS receiver 175 can be coupled to a GPS antenna 179. Although the various antennas are shown as separate hardware components of the mobile computing device 100, they can be incorporated into other components. For example, GPS antenna 179 can be incorporated into the GPS receiver 175. In addition, antennas shown as separate in FIG. 1 can be implemented as a single antenna.

The illustrated components 105 are not required or all-inclusive, as any components can be deleted and other components can be added.

Figure 2:
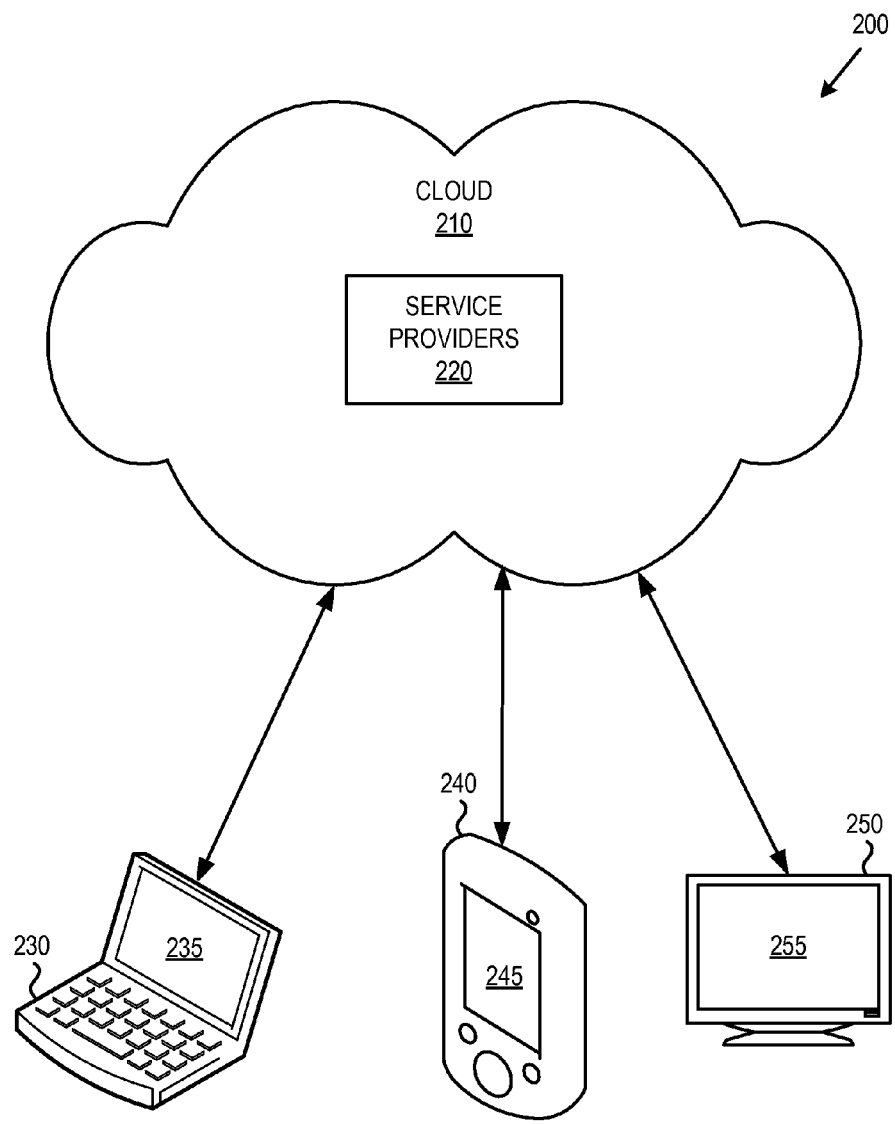
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing, mobile device or user authentication) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smartphone, personal digital assistant or the like. Connected device 250 represents a device with a large screen 255. For example, connected device 250 could be a television with Internet connectivity, or a television connected to another device capable of connecting to the cloud such as a set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking and website hosting. The service providers can host online marketplaces offering wide varieties of goods and services such as authentication plugins and plugin upgrades, and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Figure 3:
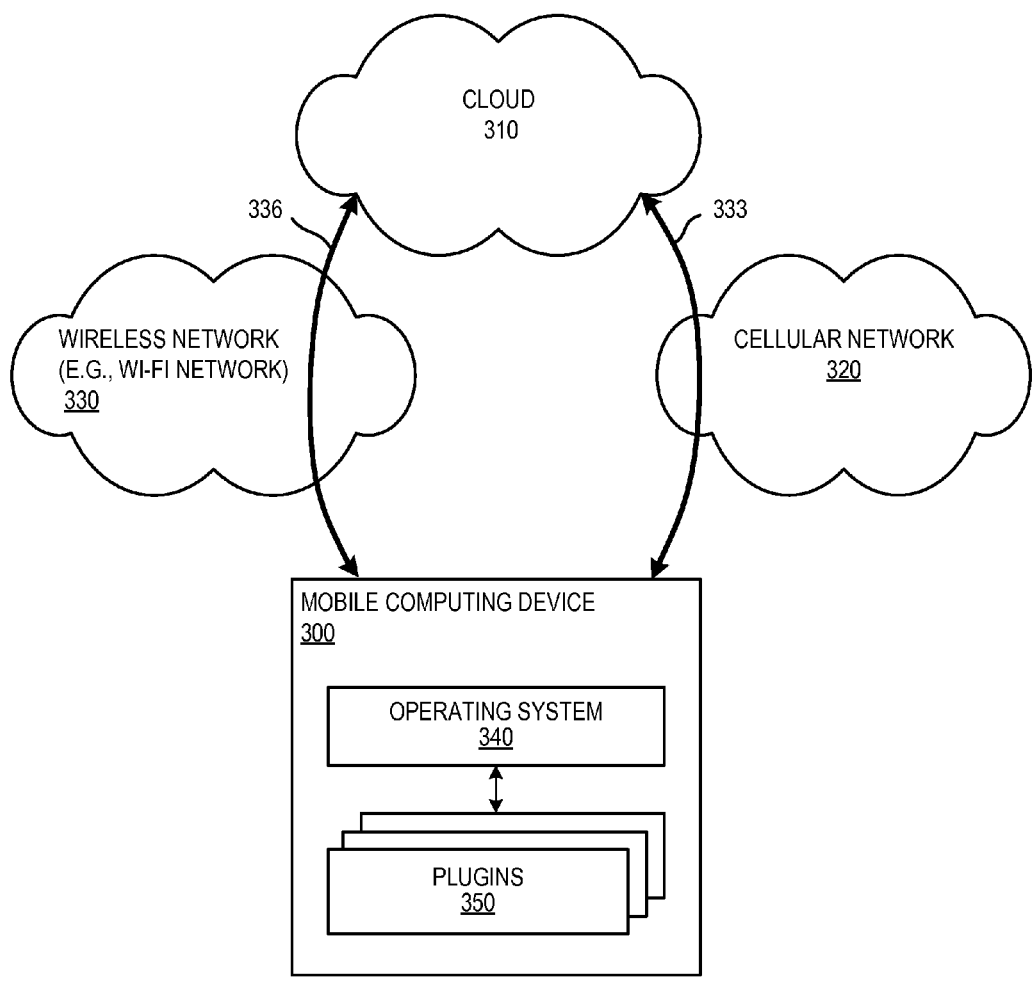
FIG. 3 is a block diagram of an exemplary mobile computing device connected to a cloud via a cellular network and a wireless network.

FIG. 3 is a block diagram of a mobile computing device 300 connected to a cloud 310 via a cellular network 320 and a wireless network 330. Using the offloading methods described herein, data traffic 333 between the cloud 310 and the mobile device 300 traveling through the cellular network 320 can be offloaded as data traffic 336 that travels through the wireless network 330. The wireless network 330 can be any wireless WLAN (Wireless Local Area Network), such as a Wi-Fi network accessed by one or more Wi-Fi network access points (Wi-Fi hotspots). Although the technologies described herein are generally discussed with respect to offloading data traffic to a wireless network, cellular traffic can be offloaded to a wired network if a wired connection to the mobile device be available (e.g., Ethernet, USB, coaxial cable).

As used herein, the term "data traffic" includes any type of information that can be exchanged between the mobile device 300 and the cloud 310, including audio and video data.

As used herein, the term "offloading" means redirecting at least a portion of data traffic flowing between the cloud 310 and the mobile device 300 from the cellular network 320 to the wireless network 330. In some embodiments, data traffic can be offloaded to the wireless network such that no or only a small amount of data traffic travels through the cellular network 320. In other embodiments, offloading involves the cellular network data traffic is simply reduced, which can be performed by limiting cellular network data rates or quantities of data transferred through the cellular network 320, limiting the types of data sent through the cellular network 320, offloading certain types of data traffic or in other manners. For example, offloading can comprise offloading video data to the wireless network 330. In still other embodiments, data traffic continues to be passed through the cellular network 320 after a mobile device is connected to a wireless network 330, and offloading occurs when the data traffic exceeds a specific threshold. Other offloading schemes can be utilized.

The mobile device 300 comprises an operating system 340 and plugins 350. The extensible framework (framework) described herein comprises portions of the operating system 340 and the plugins 350. The operating system 340 comprises application program interfaces (APIs) that can be called by the plugins 350 and callbacks that call the plugins 350. The APIs and callbacks in the operating system 340 can be used by the plugins 350 to, for example, specify wireless networks for offloading, report authentication results, and to provide messages to the operating system 340 to be presented to the mobile device user. Generally, an individual plugin supports offloading tasks associated with wireless networks owned, operated or borrowed by a single MO or partner of a MO, such as a virtual mobile network operator. A plugin may also support offloading tasks associated with wireless networks that are not associated with a MO, such networks that are directly associated with a Wi-Fi hotspot aggregator (although, in some instances a hotspot aggregator may be a business partner of a MO). In various embodiments, an active plugin is a plugin associated with a mobile operator to whose wireless networks a mobile device or mobile device user can connect. Determining an active plugin can be determined when a mobile computing device is turned on (e.g., as part of a boot-up procedure), when a mobile computing device scans for and detects wireless networks, or another time.

Because mobile devices can use wireless networks associated with more than one mobile operator, the mobile device 300 can contain multiple plugins 350 that are activated according to subscriber (mobile device and/or user) identity or properties of a cellular network 320 over which the mobile device is receiving/sending data traffic or wishes to connect. Thus, there can be more than one active plugin. Selection of which plugin to activate can be based on properties stored on a SIM card such as an IMSI, Mobile Country Code (MCC), Mobile Network Code (MNC) or Mobile Subscription Identifier Number (MSIN); properties stored in the memory of the mobile device such as an International Mobile Equipment Identifier (IMEI), Electronic Serial Number (ESN) or a Mobile Equipment Identifier (MEID); and properties stored on a Removable User Identity Module (R-UIM) or a Universal Integrated Circuit Card (UICC), two other types of mobile computing device smart cards. The plugins 350 can provide an indication to the operating system 340 whether it is to be activated based on subscriber and/or network identifier information. In some embodiments, selecting an active authentication plugin comprises querying authentication plugins installed on a mobile device and selecting the first authentication plugin to respond positively to the query (or the first N authentication plugins to respond positively to the query if the multiple active authentication plugins are allowed) as the active authentication plugin (or plugins).

Thus, multiple plugins can be installed on a mobile device to support Wi-Fi hotspot connectivity on different mobile networks. Alternatively, a single plugin can support connection to wireless networks of multiple mobile operators. The mobile device 300 can switch from one plugin to another when, for example a SIM card is exchanged or the mobile device otherwise switches from one cellular network to another. The mobile device 300 can also switch plugins in response to user input, such as when the user provides input indicating that the mobile device 300 is to switch from a wireless network operated by a first mobile operator to a wireless network operated by a second mobile operator.

The operating system 340 performs various offloading and network tasks. In various embodiments, these tasks are performed by a plugin host. For example, the operating system 340 can call a plugin 350 to inquire about a network that is currently not detectable by the mobile device 300, but is presumed to be available due to the mobile device's physical location (which can be determined through information received through a satellite navigation system receiver (e.g., GPS receiver 175), by triangulation between cell towers, or based on the known locations of Wi-Fi routers in the vicinity of the mobile device).

For instance, a mobile computing device may be near four Wi-Fi hotspots, three of which the mobile device is able to connect to but are not access points for networks associated with the mobile operators associated with the software plugins installed on the mobile device. The fourth wireless hotspot is just beyond the mobile computing device's wireless communication range and is operated by a MO associated with the active plugin. In such a situation, the framework can notify the user of the presence of nearby Wi-Fi networks associated with the MO. Such notification can be made via audio, text or video. In one embodiment, the user is notified of the nearby MO Wi-Fi hotspot via display of a map showing the user's current location and the location of the nearby MO Wi-Fi hotspot, along with a recommendation that the user should move closer to the MO Wi-Fi hotspot and directions on how to get to the hotspot. The MO Wi-Fi hotspot can be highlighted or otherwise marked to distinguish it from other Wi-Fi hotspots shown on the map.

The operating system 340 can also respond to a user request to connect to a particular wireless network within wireless communication range of a device, such as a router, that has been identified as a Wi-Fi hotspot and instruct the plugin 350 to perform validation and authentication for that network. Thus, the framework can support both automatic network connections (e.g., connection to a wireless network contained in a wireless network database supported by a plugin) and manual network connections (e.g., connections to a network specified by a user). Further, the operating system 340 can determine whether to scan for wireless networks, based on user preferences, battery life, system state or other factors. For example, a user may indicate that certain networks are not to be connected to or how often the device is to scan for wireless networks. In some embodiments, the mobile device 300 can be configured to scan for networks if the mobile device's estimated battery life remains above a threshold (which could be a default value or user-specified). As used herein, the phrase "wireless communication range" means the distance from a mobile computing device over which a mobile computing device can wirelessly communicate with another computing device, such as a network computing device (e.g., a router) or another wireless computing device (e.g., a smartphone).

The operating system 340 also provides an interface for notifying a user about conditions that may require the user's attention, such as the user's data plan for a network being ineligible or insufficient to support data traffic offloading, or that a user is to contact customer support of the operator of a wireless network. The operating system 340 can decide when, how often and through what medium such notifications are to be presented to the user. Notification properties can be specified by a user as well. Typically, a plugin cannot directly cause notifications to be presented to the user. By passing user notifications from a plugin through the operating system, messages can be delivered to the user via the operating system, thereby allowing the plugin-generated message to be delivered in a manner consistent with other messages provided by the operating system to maintain a consistent user experience.

The operating system 340 is further capable of receiving from the plugins 350 information about the wireless networks supported by the plugins 350. After detecting the presence of one or more wireless networks in wireless communication range, the operating system 340 can determine which plugins are active plugins and are to be used for offloading tasks such as providing a list of preferred networks out of the detected networks and authenticating a mobile computing device or user after connection to a wireless network has been made. Thus, the plugins 350 allow mobile operators to pre-configure a list of preferred wireless networks.

The plugins 350 are software modules, typically separate from a mobile device's operating system, that perform various network offloading functions. The plugins 350 can be provided by, for example, a mobile operator or an independent software vendor (ISV), and can come installed on a mobile computing device or be downloaded for installation by a mobile computing device user. A plugin can inform the operating system 340 of the characteristics of one or more wireless networks, such as information needed to connect a mobile computing device to the network, whether the mobile device is to be connected to a particular network automatically, which wireless networks are preferred and connection priority information for the networks. For example, consider a mobile computing device that includes two plugins, a first plugin that supports T-Mobile® Wi-Fi hotspots and a second plugin that works with AT&T® Wi-Fi hotspots. The mobile device can activate the appropriate plugin depending on whether it has detected an AT&T® SIM card or a T-Mobile® SIM card on the device or if the user is attempting to connect to an AT&T® hotspot or a T-Mobile® hotspot. The plugins 350 can also inform the operating system 340 whether connection to a network requires the presence of a SIM card. Connection priority information can be any information that can be used by a plugin to provide a plugin host a connection order for a list of wireless networks that have been detected by the mobile device. For example, a wireless network can have a priority (e.g., "1," "2," "3" . . . or "A," "B," "C" . . . ) based on factors such as the bandwidth capacity of the network.

A plugin 350 can be configured to receive a list of wireless networks detected within wireless communication range of the mobile device 300 and return to the operating system 340 a list of preferred networks, an order in which the device 300 is to attempt connection to the preferred networks, and connection and authentication information for the preferred networks. In some embodiments, the operating system 340 can select which network to connect to out of the preferred networks based on user settings (e.g., user-preferred Wi-Fi networks or network connection order) and other factors. By having user settings specified within the offloading framework, a user can manage offloading preferences by setting one group of user preferences and not having to specify settings or preferences within multiple software applications (e.g., multiple plugins).

A plugin 350 can be configured to support hidden networks as well. Hidden networks comprise networks that do not proactively broadcast their presence. Hidden networks can be networks that are exclusively or primarily dedicated for offloading. In order to support hidden networks, a plugin 350 can provide network identifiers (e.g., SSIDs) of the hidden networks for which the mobile device is to proactively search. The mobile device can determine whether to search for these hidden networks based on user settings (e.g., the system may be configured to allow a user to disable searching for or connecting to a hidden network), power consumption rates, battery levels and the like. For example, a mobile computing device can be capable of initiating a scan for hidden wireless networks in response to a power consumption rate of the mobile computing device to fall below a power consumption rate threshold, a battery level of the mobile computing device to fall below a battery level threshold, or the inability to detect any other wireless networks within wireless communication range of the mobile device.

In response to a notification from the operating system 340 that the mobile device has successfully connected to a network, a plugin 350 can validate the network's identity, authenticate the user or perform any other action required to make the Wi-Fi connection operational for offloading cellular traffic. If any of these operations fail, the plugin 350 can notify the operating system 340 to disconnect from the network. Typically, to improve system stability, the plugins are not capable of causing a mobile computing device to scan for Wi-Fi networks, or connect to / disconnect from a wireless network. The plugins also are not typically allowed to run background tasks on the mobile computing device.

In some embodiments, a plugin 350 can be configured to cause various notifications to be presented to a user that require user response. For example, the plugin can cause queries to be presented at the mobile device display asking whether a user accepts, for example, the terms of use for a network or settings for particular network properties, such as privacy settings, before the network can be used for offloading. These notifications can also comprise informational notifications that can be simply dismissed by the user. For example, a plugin can cause one or more advertisements to appear on the mobile device when the mobile device connects to a particular network supported by advertising. The advertisements can be dismissed by, for example, clicking on an "OK" button in the advertisement window or closing the advertising window. In some embodiments, a plugin can cause notifications requiring a user response before a connected network can be used for networking to be presented by sending a user query request to the plugin host. The user query request can comprise the information that user is to approve or agree to (e.g., the text of the terms of use) or a reference to such information (e.g., a link to where the terms of use can be found). In return, the plugin host can send information to the plugin indicating whether the user has approved of or agreed to the information contained in or referenced in the user query request.

The plugins 350 can run as dedicated processes on the mobile device 300 with privileges set to prevent an operating system failure if a plugin crashes. If a plugin crashes, the plugin process can be restarted without affecting system stability.

The plugins 350 can further be configured to specify that the operating system 340 is to periodically (or on another time basis) issue a callback to a plugin that causes the plugin to retrieve any available plugin updates. The mobile device 300 can come with one or more plugins 350 preinstalled, and additional plugins can be added to the device as needed or as they become available. In one embodiment, the framework can contain one or more of the following plugin interfaces: an initialization interface, a check network interface, a mask interface, a pre-connect interface, an authentication interface, a keep alive interface, a connection failure interface, a reset interface, and a control interface.

An initialization interface can return a registration status (i.e., status of the registration of a mobile device with a cellular network), a frequency (e.g., plugin update frequency) at which the plugins are to be updated (e.g., updating of Wi-Fi hotspot information for a mobile operator, such as the location of new hotspots, removal of hotspots no longer in existence or now owned or operated by another MO, etc.), connection information (e.g., network protocol), authentication information (e.g., authentication schema being used for the networks)) a frequency (e.g., keep alive message frequency) at which keep alive messages are to be sent to maintain a connection between the mobile device and a wireless network. As a plugin may contain a network database that comprises information on dozens, hundreds or even thousands of wireless networks, the network database likely needs to be updated on occasion. In response to receiving a plugin update frequency or a keep alive message frequency, a plugin host can send plugin update commands or keep alive message commands at substantially at least the periodic update frequency or the keep alive message update, respectively. For example, if a plugin provides a plugin host with a periodic update frequency of three days, the plugin host can send periodic update commands to the plugin at least approximately every three days.

A check network interface (e.g., Check_SSID interface) can determine whether networks associated with one or more network identifiers (e.g., SSIDs) supplied to the interface are known to the plugin and can be used for offloading. The check network interface can indicate that a supplied network identifier is associated with a wireless network that can be used for offloading by, for example, returning a "1" if the supplied network identifier is associated with a wireless network that can be used for offloading and returning a "0" otherwise. If more than one network identifiers are supplied, the check network interface can return one or more preferred wireless networks, connection information for the preferred wireless networks and a connection order for the one or more preferred wireless networks.

A mask interface (e.g. Get_Network_Mask) returns a "mask" for the network identifier (e.g., SSID) supplied to the plugin. A mask is a more "user-friendly" descriptor for a wireless network. For example, a mask interface can return the mask "AT&T Wi-Fi Hot Spot" for the supplied SSID "ATTWIFI", and the mask "AT&T Metro Wi-Fi" can be returned for the supplied SSID "ATTMETROWIFI."

A Pre-Connect interface can be called prior to a network connection attempt to enable the plugin to perform any pre-connect initialization or preparatory tasks.

An authentication interface (e.g., Attempt_Authentication interface) can be called after a mobile device is connected to a wireless network to direct a plugin to perform authentication tasks such as authenticating the mobile device or mobile device user against a mobile operator authentication database. The authentication interface can return an indication of whether authentication was successful. A keep alive interface (e.g., Send_Keep_Alive_Message interface) can be called to instruct a plugin to send a keep alive message in order to maintain a wireless network connection. A connection failure interface (e.g., Connection_Failure interface) can be called to cause a plugin to collect and report network telemetry data for an indicated network. A periodic update interface (e.g., Periodic_Update interface) causes a plugin to perform a database update and send telemetry data to a remote server. A reset interface can request a plugin to reset to an initial state. A control interface can allow a mobile device to send any plugin-specific commands to the plugin.

In various embodiments, the framework can contain more or fewer plugin interfaces than those listed above, interfaces can have names other than those used above, or variations of the above interfaces. For example, an initialization interface can return a subset of the information returned by the initialization interface discussed above and a check network interface can return a list of all of the wireless networks contained in a wireless network database associated with a plugin.

Figure 4:
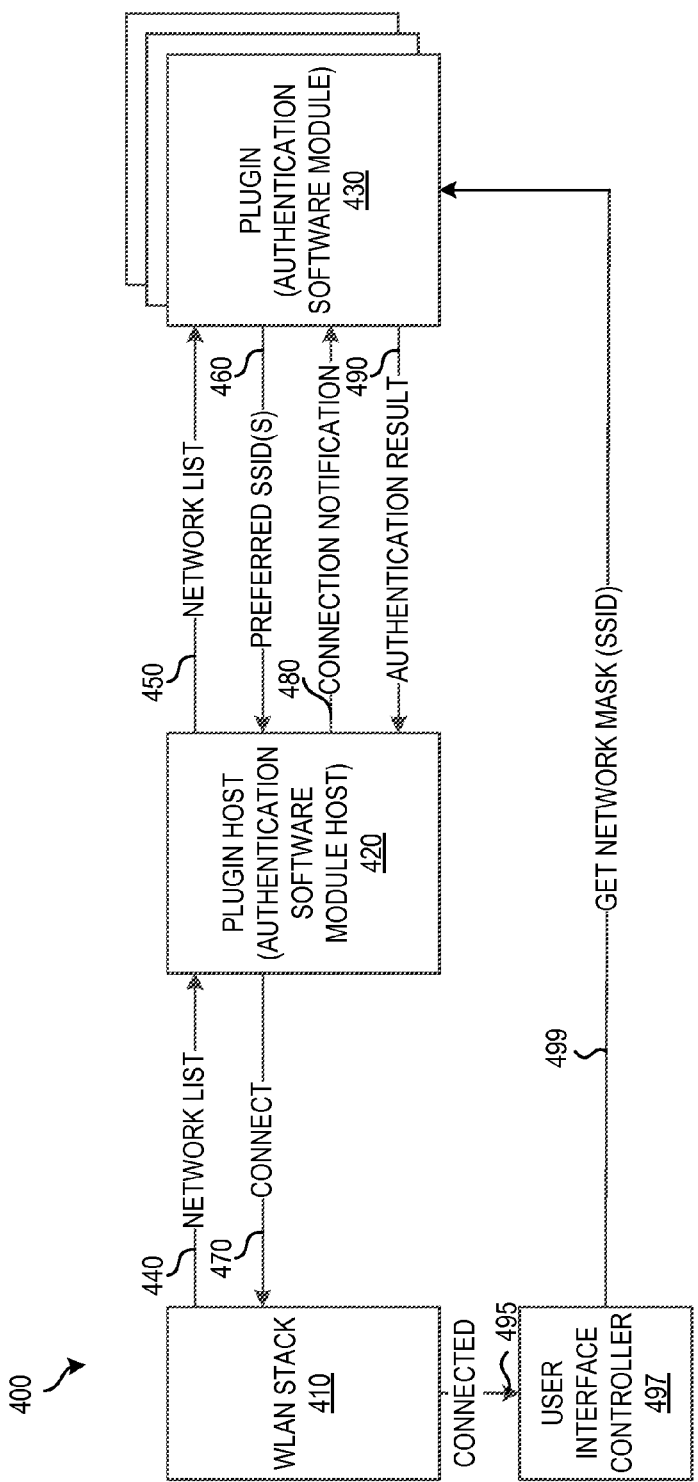
FIG. 4 is a block diagram of an exemplary implementation of an extensible framework.

FIG. 4 is a block diagram of an exemplary implementation of an extensible framework 400. The framework 400 shows messages and information being passed between a WLAN protocol stack (WLAN stack) 410, a plugin host (authentication software module host) 420, a plugin (authentication software module) 430, and a user interface controller 497. If the mobile computing device comprises a plurality of plugins, the plugin 430 can be the active authentication plugin (or one of the active plugins if multiple plugins are allowed to be active). Typically, the WLAN stack 410, plugin host 420 and user interface controller 497 are part of a mobile device operating system. Thus, the plugin host 420 typically comprises components of a mobile computing device operating system that communicate with the plugin 430. In an exemplary flow of information in the framework 400, first, the mobile device scans for WLAN networks via the WLAN stack 410. A list of available or detected WLAN networks 440 is sent to the plugin host 420. The plugin host 420 can determine whether any networks are to be removed from the list 440, for example, by checking user settings. For example, a user may have indicated that certain networks are not to be connected to, even if they are available. The network list 450, which may be a truncated version of the network list 440 is delivered to the plugin 430. The network list can comprise any information corresponding to the detected network works. The plugin 430 returns network information 460 (e.g., SSIDs) of one or more preferred wireless networks that can be used for offloading. The preferred networks are selected from the detected networks supplied by the plugin host 420. If more than one preferred wireless networks have been provided by the plugin 430, the plugin host 420 selects one for connection. The plugin host 420 then sends a connect command 470 that instructs the WLAN stack 410 to connect to the selected wireless network. For example, the plugin host 420 can select which wireless network to connect to based on a connection order supplied by the plugin 430 and/or a user-specified connection order.

In embodiments where there are more than one active authentication plugs, a network list 450 can be provided by the plugin host 420 to the active plugins. The same network list 450 can be sent to the multiple active plugins, or a network list 450 can be sent comprising information corresponding only to wireless networks associated with the mobile operator associated with the particular plugins. The plugin host 420 can then receive network information 460 for preferred networks from the active plugins 430. The plugin host 420 can then select a network to connect to from the preferred networks provided by the multiple active plugins.

If a mobile device is capable of supporting multiple simultaneous network connections, the extensible framework can connect the mobile device to more than one network for offloading. The extensible framework can make multiple network connections for offloading as follows. The mobile device can detect networks associated with the various mobile operators to which the mobile device can connect. The list of detected networks is passed by the WLAN component or subsystem to the plugin host. The plugin host sends a network list to active plugins associated with a mobile operator to whose networks the mobile device can connect. In return, each of the active plugins can send information about one or more preferred networks to the plugin host. The plugin host then selects a network from each preferred network list provided by the active plugins and instructs the WLAN component to connect to the selected networks. After connection to the selected networks has been made, for each connection, the appropriate active plugin is notified. The active plugins then attempt to authenticate the mobile device or mobile device user with the selected networks, and report the authentication results back to the plugin host. If authentication of the connected networks is successful, the mobile device can use any one of the connected networks for offloading.

After a connection to the selected network has been made, the plugin host 420 sends a connection notification 480 to the plugin 430 of the connection and requests authentication of the mobile device or a user of the mobile device. The plugin 430 then attempts to perform authentication on the network, based on the mobile operator associated with the selected network and returns an authentication result 490, which can be an asynchronous response, to the plugin host 420, reporting the status of the authentication attempt. Authentication can be performed using, for example, 802.11 open authentication, HTTPS-based authentication, EAP-SIM (Extensible Authentication Protocol-SIM) or EAP-AKA (Extensible Authentication Protocol-Authentication and Key Management) authentication or other authentication schemes. If authentication is successful, the plugin host 420 can load the connected wireless network with data traffic.

The WLAN stack 410 can also send (495) a connection notification to a user interface controller 497 of the mobile device to inform the user that the device has connected to the selected network. The user interface controller 497 can query (499) the plugin 430 for a user-friendly version of the wireless network display name (e.g., using the Get_Network_Mask interface) that may be different from the network's SSID and receive a user-friendly version of the wireless network display name in response.

If the authentication attempt was unsuccessful, the plugin host 420 can disconnect the mobile device from the wireless network. If more than one preferred network and a connection order were specified by the plugin 430, the plugin host 420 can attempt to connect to the next wireless network according to the connection order. If authentication failed because of a user's data plan eligibility or for another reason that can be corrected by the user, the plugin 430 can pass a notification to the plugin host 420 advising the user how to fix the issue such as contacting customer support or upgrading the user's data plan.

In some embodiments, the mobile computing device can be configured to allow user control over aspects of the offloading framework. For example, the mobile device can be configured to allow a user to enable or disable connectivity to individual Wi-Fi hotspots, manually connect to a hotspot network, or enable a user to configure a user profile for connection to a hotspot network if mobile operator hotspot connectivity has been disabled by the user. For example, a user can configure a user profile such that a particular Wi-Fi hotspot network is to be connected to even if hotspot connectivity for the mobile operator associated with the particular Wi-Fi hotspot has been disabled by the user. Moreover, a user can configure the framework to allow for automatic data traffic offloading to networks in addition to those for which a plugin contains connection information. Further, the mobile computing device can be configured to allow the user to enable or disable automatic Wi-Fi network offloading.

Figure 5:
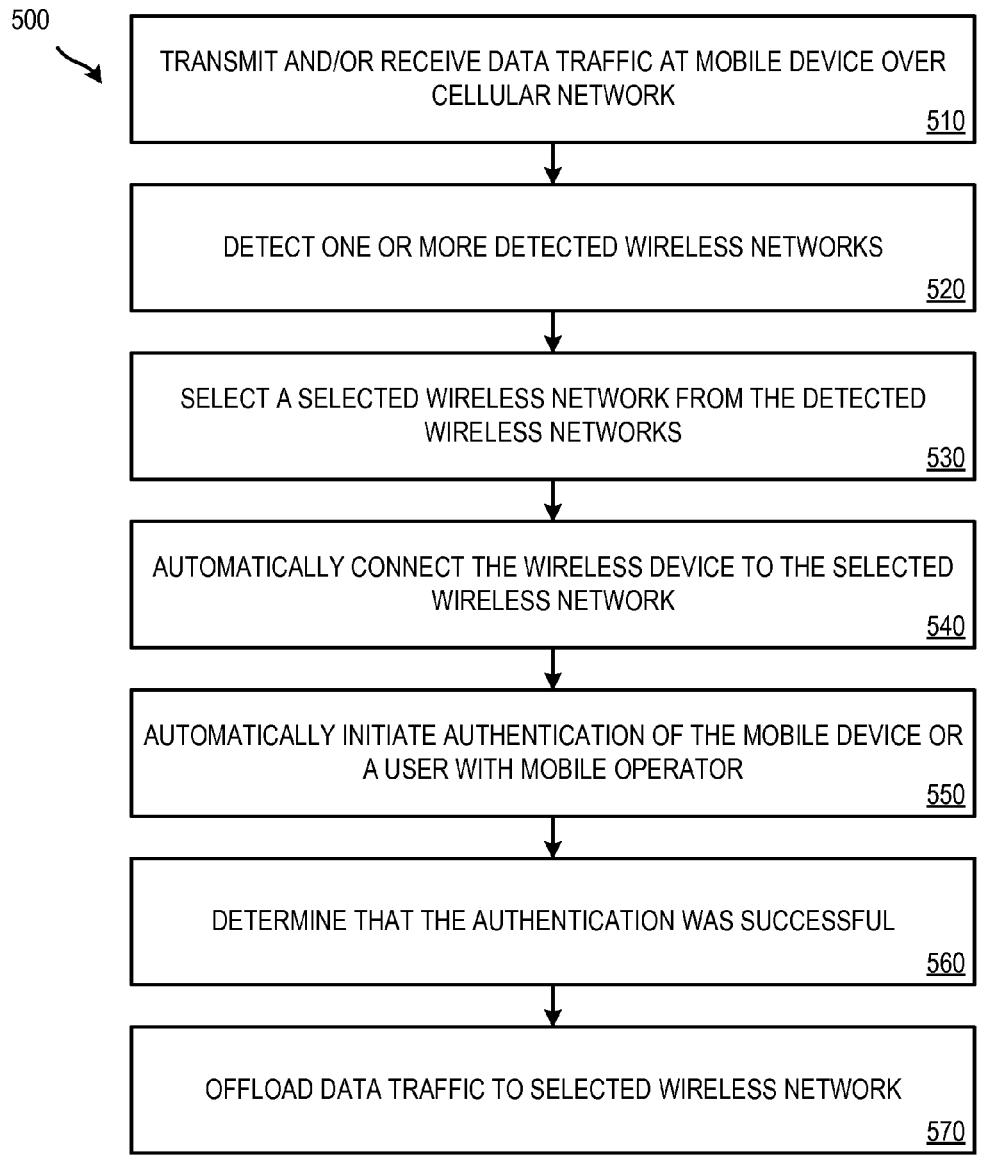
FIG. 5 is a flowchart of a first exemplary method of offloading data traffic sent over a cellular network to a mobile computing device.

FIG. 5 is a flowchart of a first exemplary method 500 of offloading mobile computing device data traffic from a cellular network to a wireless network. The method 500 can be performed by, for example, a smartphone configured to operate with AT&T® cellular and wireless networks and containing an authentication plugin host and an AT&T® authentication plugin to enable automatic connection and offloading of data traffic to AT&T® wireless networks. At 510, mobile computing device data traffic is transmitted and/or received over a cellular network. In the example, the smartphone transmits and/or receives data traffic over an AT&T® cellular network. At 520, one or more detected wireless networks are detected within range of the mobile computing device. In the example, the user arrives in a coffee shop and the smartphone detects two Wi-Fi hotspots, one based in the coffee shop and another based in an office next door. The coffee shop Wi-Fi hotspot is an AT&T® Wi-Fi hotspot. At 530, a selected wireless network is selected from the one or more detected wireless networks. The selected wireless network being associated with a mobile operator. In the example, the smartphone selects the wireless network associated with the AT&T® Wi-Fi hotspot. At 540, the wireless communication device is automatically connected to the selected wireless network. In the example, the smartphone automatically connects to the AT&T® Wi-Fi hotspot. At 550, authentication of the mobile computing device or a user of the mobile computing device with the mobile operator is automatically initiated. In the example, the smartphone automatically initiates authentication of the smartphone with AT&T®. Initiating authentication comprises sending information to a remote AT&T® server over the AT&T® Wi-Fi wireless network. At 560, authentication of the mobile computing device or the user of the mobile computing device is determined to have been successful. In the example, the smartphone receives information from the remote AT&T® server indicating that the smartphone has been authenticated for use on the connected network, or information that the smartphone can use to determine that authentication has been successful. At 570, data traffic is offloaded to the selected wireless network. In the example, the smartphone offloads at least a portion of the data traffic to the AT&T® wireless network. Thus, the smartphone has automatically detected and connected to an AT&T® wireless network and automatically offloaded data traffic from an AT&T® cellular network to an AT&T® wireless network without user intervention. In some embodiments, the method 500 can comprise fewer actions than those shown in FIG. 5.

The extensible framework described herein provides at least the following exemplary advantages. By controlling access to core system APIs, mobile device operating system stability can be improved and battery life extended. For example, by preventing software applications executing on the mobile device, such as plugins or other software applications that interact with the plugins, from having unfettered access to system functions that scan for the presence of wireless networks, applications are prevented from continually or frequently scanning for wireless networks, which can reduce battery life.

Further, as the current mobile operator ecosystem becomes further fragmented and different mobile operators continue to use different solutions and protocols for offloading cellular data to Wi-Fi hotspots, it is becoming more onerous for platform developers to develop and maintain an offloading solution that satisfies the requirements of all the mobile operators and is kept up to date. By allowing multiple plugins to be installed on a mobile device, new plugins to be installed, and installed plugins to be updated, the framework is a dynamic and expandable one that can adapt to changes in network communication protocols, the development of new protocols, the presence of new hotspots, and changes in the mobile operator business landscape (e.g., the appearance of new mobile operators, merging of mobile operators, mobile operators going out of business).

Moreover, the offloading framework described herein allows mobile computing devices to maintain system performance and stability by not allowing access to network scan, connect and disconnect features while at the same time providing application developers (MOs and ISVs) with a framework within which they can implement Wi-Fi offloading solutions according to mobile operator's specifications.

Furthermore, system platform developers have to balance between providing ISVs with flexibility by allowing access to core system APIs and locking down APIs that could negatively affect system performance, stability and end user experience. The extensible framework described herein allows mobile devices to maintain system performance and stability while at the same time providing application developers with the means to implement Wi-Fi offloading solutions according to mobile operator's specifications.

Figure 6:
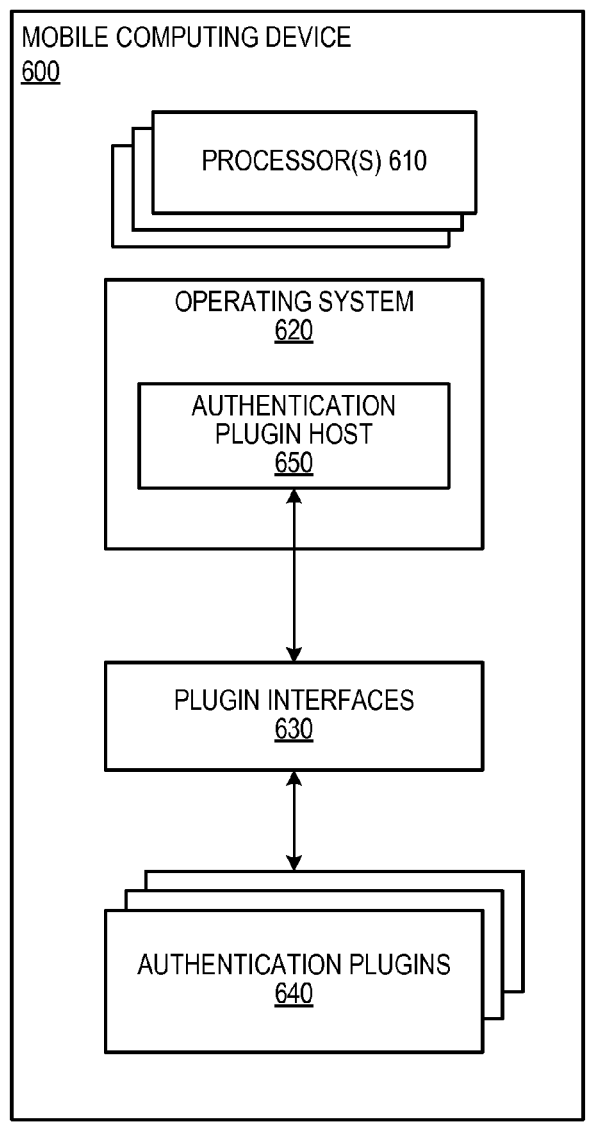
FIG. 6 is a block diagram of a mobile computing device employing the extensible framework described herein.

FIG. 6 is a block diagram of a mobile computing device 600 employing the extensible framework described herein. The mobile computing device 600 comprises one or more processors 610, an operating system 620, plugin interfaces 630 and authentication plugins 640. The operating system 620 comprises an authentication plugin host 650 that uses the plugin interfaces 630 to communicate with the authentication plugins 640. The plugin interfaces 630 can comprise one or more of any of the plugin interfaces described herein (e.g., initialization, authentication, check network), as well as other interfaces.

Figure 7:
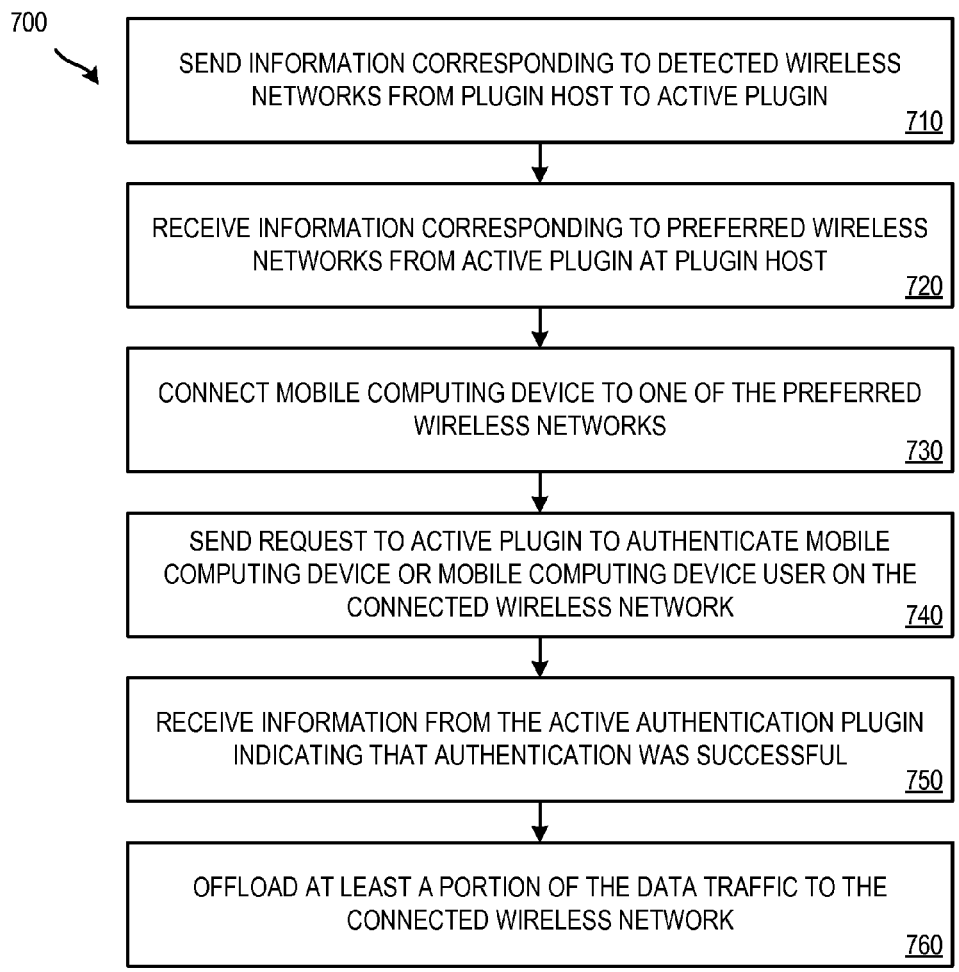
FIG. 7 is a flowchart of a second exemplary method of offloading data traffic sent over a cellular network to a mobile computing device.

FIG. 7 is a flowchart of a second exemplary method 700 of offloading data traffic sent over a cellular network to a mobile computing device. The method 700 can be performed by, for example, a tablet computing device having an operating system comprising an authentication plugin host, and storing multiple plugins with a plugin associated with mobile operator A being the active authentication plugin.

At 710, information corresponding to one or more detected wireless networks is sent from an authentication plugin host to an active authentication plugin. The one or more detected wireless networks and the active authentication plugin are associated with a mobile operator. In the example, the tablet's authentication plugin host sends SSIDs for detected wireless networks X, Y and Z associated with mobile operator A to the active authentication plugin.

At 720, information corresponding to one or more preferred wireless networks selected from the one or more detected wireless networks is received from the active authentication plugin at the authentication plugin host. In the example, the tablet's authentication plugin host receives from the active plugin the SSIDs for preferred wireless networks X and Z. A connection order is also sent to the authentication plugin host indicating that wireless network X is to be connected to before wireless network Z.

At 730, the mobile computing device connects to one of the one or more preferred wireless networks. The preferred wireless network to which the mobile computing device is connected being a connected wireless network. In the example, the tablet connects to wireless network X. At 740, a request is sent to the active authentication plugin to authenticate the mobile computing device or a user of the mobile computing device on the connected wireless network. In the example, the tablet's authentication plugin host sends a request to the active plugin to authenticate the tablet on the wireless network X.

At 750, information is received from the active authentication plugin indicating that authentication was successful. In the example, the authentication plugin host receives confirmation from the mobile operator A plugin that the tablet has been authenticated by mobile operator A.

At 760, at least a portion of the data traffic is offloaded to the connected wireless network. In the example, the tablet offloads at least a portion of the data traffic it has been receiving and sending over a cellular network to wireless network X.

Figure 8:
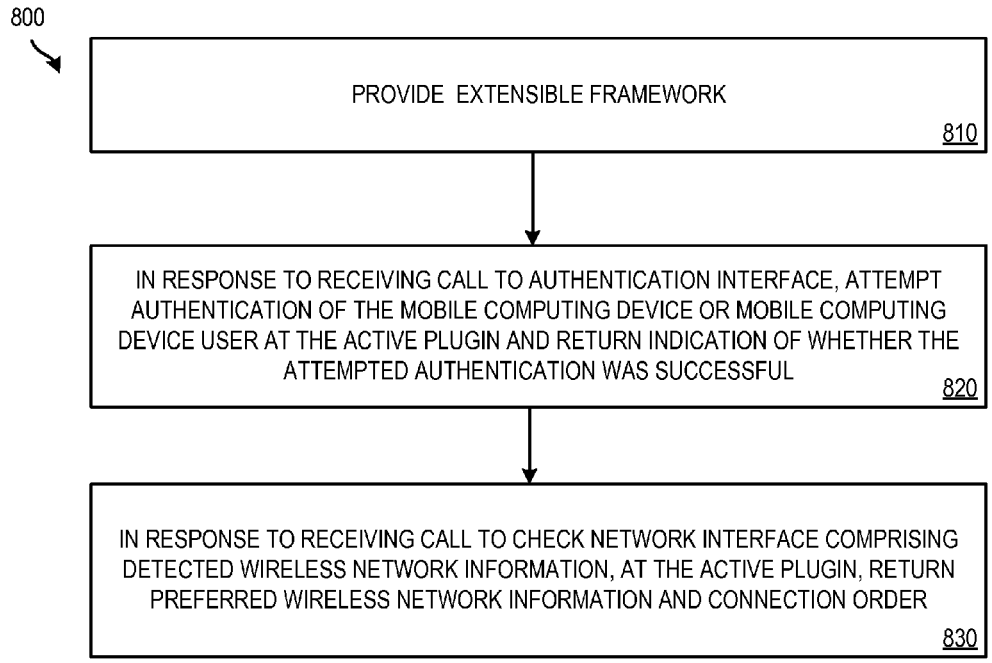
FIG. 8 is a flowchart of a third exemplary method of offloading data traffic sent over a cellular network to a mobile computing device.

FIG. 8 is a flowchart of a third exemplary method of offloading data traffic sent over a cellular network to a mobile computing device. At 810, an extensible framework comprising an authentication plugin host, a plurality of authentication plugins comprising an active authentication plugin, an authentication interface and a check network interface is provided.

At 820, in response to receiving at least one call to the authentication interface from the authentication plugin host, the active authentication plugin attempts authentication of the mobile computing device or a user of the mobile computing device on a network to which the mobile computing device is connected and returns an indication of whether the attempted authentication was successful. At 830, in response to receiving at least one call to the check network interface comprising information corresponding to one or more detected wireless networks, the active authentication plugin returns information corresponding to one or more preferred wireless networks and a connection order for the one or more preferred wireless networks.

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including smart phones or other computing devices that include computing hardware). Computer-readable storage media does not include propagating signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to a mobile computing device to implement an extensible framework.

The various methods disclosed herein can also be described in the general context of computer-executable instructions, such as those included in program modules, being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises." Further, as used herein, the term "and/or" means any one item or combination of any items in the phrase.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while remaining faithful to the concepts described above. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

We claim:

1. A method of offloading data traffic sent over a cellular network to a mobile computing device, the method comprising:
    executing a plurality of authentication components, each having different mobile operator-specific logic, wherein the authentication components are plugins;
    transmitting from a plugin host, as part of the operating system of the mobile computing device, a list of detected wireless networks to the plurality of authentication components, wherein the plugin host is coupled to the plurality of authentication components;
    retrieving from at least one of the authentication components within the mobile computing device, first information identifying one or more preferred wireless networks selected from the list of detected wireless networks;

selecting one of the preferred wireless networks using the plugin host;

connecting the mobile computing device to the selected preferred wireless network;

requesting authentication of the mobile computing device on the selected preferred wireless network, based on second information associated with the mobile computing device or a user of the mobile computing device, the first information and the second information within the authentication component; and upon successful authentication, offloading at least a portion of the data traffic to the preferred wireless network.

2. The method according to claim 1, comprising:
receiving input designating the one or more wireless networks as preferred.

3. The method according to claim 1, wherein the first information further provides connection priority information for connecting the mobile computing device to the one or more preferred wireless networks.

4. The method according to claim 1, comprising:
retrieving a periodic update frequency for the authentication component.

5. The method according to claim 4, comprising:
in response to retrieving the periodic update frequency, requesting an update to the authentication component at substantially at least the retrieved periodic update frequency.

6. The method according to claim 1, comprising:
receiving from at least one of the plurality of available wireless networks, a query for selecting one of the plurality of authentication components within the mobile computing device.

7. The method according to claim 6, comprising:
selecting the authentication component from the plurality of available authentication components based on query response time.

8. The method according to claim 6, wherein the plurality of authentication components are associated with a plurality of mobile operators.

9. The method according to claim 1, comprising:
scanning the plurality of available wireless networks for one or more hidden wireless networks based on information for the one or more hidden wireless networks in the authentication component.

10. A mobile computing device that includes a processor and memory, the mobile computing device being adapted to perform a method for offloading data traffic sent over a cellular network to the mobile computing device, the method comprising:

providing a plugin host as part of an operating system on the mobile computing device and a plurality of authentication components, which are plugins coupled to the plugin host, wherein the plurality of authentication components are associated with different mobile operator-specific logic;

transmitting from the plugin host to the plugins, detected wireless networks;

retrieving from an authentication component within the mobile computing device, first information identifying one or more preferred wireless networks selected from the detected wireless networks;

connecting the mobile computing device to the identified preferred wireless network;

requesting authentication of the mobile computing device on the identified preferred wireless network, based on second information associated with the mobile computing device or a user of the mobile computing device, the first information and the second information within the authentication component; and upon successful authentication, offloading at least a portion of the data traffic to the identified preferred wireless network.

11. The mobile computing device according to claim 10, wherein the method further comprises:
receiving input designating the one or more wireless networks as preferred.

12. The mobile computing device according to claim 10, wherein the first information further provides connection priority information for connecting the mobile computing device to the one or more preferred wireless networks.

13. The mobile computing device according to claim 10, wherein the method further comprises:
retrieving a periodic update frequency for the authentication component.

14. The mobile computing device according to claim 13, wherein the method further comprises:
in response to retrieving the periodic update frequency, requesting an update to the authentication component at substantially at least the retrieved periodic update frequency.

15. The mobile computing device according to claim 10, wherein the method further comprises:
receiving from at least one of the plurality of available wireless networks, a query for selecting one of a plurality of authentication components within the mobile computing device.

16. The mobile computing device according to claim 15, wherein the method further comprises:
selecting the authentication component from the plurality of available authentication components based on query response time.

17. The mobile computing device according to claim 15, wherein the plurality of authentication components are associated with a plurality of mobile operators.

18. A computer-readable storage medium including instructions that upon execution cause a mobile computing device to:

receive from at least one of a plurality of available wireless networks, a query for selecting one of a plurality of authentication components within the mobile computing device, wherein the authentication components include logic associated with a corresponding mobile operator and wherein the authentication components are plugins to an operating system of the mobile computing device;

select the authentication component from the plurality of available authentication components based on a received positive query response;

retrieve from the authentication component within the mobile computing device, first information identifying one or more preferred wireless networks;

detect one of the one or more preferred wireless networks as one of the plurality of available wireless networks;

connect the mobile computing device to the detected preferred wireless network;

request authentication of the mobile computing device on the detected preferred wireless network, based on second information associated with the mobile computing device or a user of the mobile computing device, the first information and the second information within the authentication component; and upon successful authentication, offload at least a portion of the data traffic to the detected preferred wireless network.

\* \* \* \* \*